United States Patent [19]

Rosaen et al.

[11] 4,215,718

[45] Aug. 5, 1980

[54] RELIEF VALVE

[76] Inventors: Borje O. Rosaen, 4031 Thornoaks Dr.; Dale P. Fosdick, 3000 Hunting Valley Dr., both of Ann Arbor, Mich. 48104

[21] Appl. No.: 963,035

[22] Filed: Nov. 22, 1978

[51] Int. Cl.² .............................................. F16K 15/02
[52] U.S. Cl. ................................. 137/543.19; 251/337
[58] Field of Search .............. 137/540, 543.19, 543.17, 137/543.21; 251/337

[56] References Cited

U.S. PATENT DOCUMENTS

| 1,926,800 | 9/1933 | Casper | 137/539 X |
| 3,189,046 | 6/1965 | Callahan et al. | 137/540 X |
| 3,473,626 | 10/1969 | Tadahide et al. | 137/543.19 X |
| 3,503,418 | 3/1970 | Petrucci et al. | 137/540 X |
| 3,626,977 | 12/1971 | Riley et al. | 137/543.19 |
| 4,009,017 | 9/1977 | Jones | 137/540 |

FOREIGN PATENT DOCUMENTS 227358  3/1960 Australia .............................. 137/543.19

Primary Examiner—William R. Cline

Attorney, Agent, or Firm—Gifford, Van Ophem, Sheridan & Sprinkle

[57] ABSTRACT

A novel relief valve is provided for connection with a fluid system. The relief valve includes an elongated housing having an inlet and an outlet with a fluid passage connecting the inlet to the outlet. Preferably, the housing is constructed of a number of conventional and readily available pipe fittings. A relief valve assembly is disposed within the fluid passageway and comprises a perforated tube with a valve seat positioned at one axial end of the tube and adjacent the housing inlet. A valve member is also disposed within the perforated tube and is urged against the valve seat by a helical spring to normally prevent fluid flow through the relief valve. A stop pin is disposed through substantially diametrically opposed apertures in the perforated tube at a position spaced from the valve seat which acts as a stop for the end of the helical spring opposite from the valve member. The axial length, and thus the compression, of the spring can be varied by changing the axial position of the stop pin which accordingly varies the fluid pressure at the housing inlet necessary to open the valve assembly and to permit fluid flow through the relief valve.

6 Claims, 4 Drawing Figures

RELIEF VALVE

BACKGROUND OF THE INVENTION

I. Field of the Invention

The present invention relates generally to relief valves, and more particularly, to a relief valve with improved means for varying the opening pressure of the relief valve.

II. Description of the Prior Art

There are a number of previously known relief valves. These prior known relief valves typically employ a housing having an inlet which is fluidly connected to a pressurized fluid line of a fluid system. At a predetermined pressure, the relief valve opens to permit fluid flow from the inlet on the relief valve housing and to an outlet also formed on the relief valve housing. Such relief valves are used with fluid systems to prevent excessive pressure build up in the fluid system. Otherwise, such excessive pressure can undesirably damage the fluid system and/or its associated components.

These previously known relief valves, however, all suffer from a number of common disadvantages. One disadvantage is that the relief valve housing, usually a casting, is not only expensive but oftentimes requires complicated mechanical and fluid connections to the fluid system. Moreover, such relief valve housings must be pressure tested to insure their safety and operability.

A still further disadvantage of these previously known relief valves is that the valve assembly itself is manufactured to a preset opening pressure rating. Since the opening pressure of the valve assembly itself is not adjustable, an entire line of relief valve assemblies must be manufactured and stocked in order to accommodate different opening pressure requirements. Moreover, if a different pressure opening is desired for a given relief valve application, the entire valve assembly must be removed and replaced with a new and different valve assembly.

A still further disadvantage of these previously known relief valves are that they are unduly complex and therefore expensive in construction. Moreover, such relief valve constructions oftentimes have fluid restrictions formed therein which can create unduly high pressure parts and thus require expensive heavy duty construction.

SUMMARY OF THE PRESENT INVENTION

The present invention overcomes all of the above mentioned disadvantages of the previously known relief valves by providing such a valve which is simple and inexpensive in construction and in which the opening pressure of the relief valve can be simply and easily adjusted.

In brief the present invention comprises an elongated housing having an inlet formed at one end and outlet formed at the other. The inlet end preferably is constructed from a conventional reducing bushing while conventional pipe fittings connected to the bushing form the remainder of the housing. The interior of the pipe fittings form a fluid passageway connecting the housing inlet to the outlet.

A perforated tube is disposed within the fluid passageway and abuts at one end against an annular surface on the pipe fitting at the outlet end of the housing. An annular valve seat is sandwiched between the other axial end of the perforated tube and an annular surface on the reducing bushing. By tightening of the reducing bushing into its adjacent pipe fitting, the valve seat is securely sandwiched between the perforated tube and the reducing bushing.

An elongated helical spring is positioned within the interior of the perforated tube. A stop pin extends through substantially diametrically opposed apertures in the perforated tube and acts as a stop for one axial end of the helical spring while a circular valve member is disposed across the other axial end of the helical spring. The helical spring is in a state of compression and thus urges the valve member against its cooperating valve seat thus fluidly closing the fluid passageway. When a sufficient fluid pressure is applied to the housing inlet, as determined by the compression and spring force of the helical spring, the fluid pressure compresses the helical spring and moves the valve member away from the valve seat thus permitting fluid communication from the housing inlet and to the outlet. This in turn relieves the fluid pressure at the relief valve inlet.

The axial length of the helical spring, and thus its compression, can be varied by simply repositioning the stop pin through diametrically opposed apertures in the perforated tube at a different axial position along the tube. By thus varying the compression of the helical spring, the cracking or opening pressure of the relief valve is likewise varied. In practice, the cracking pressure of the relief valve can be readily varied from between 5 psi and 65 psi for a single relief valve assembly.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF THE PREFERRED EMBODIMENT OF THE PRESENT INVENTION

Figure 1:
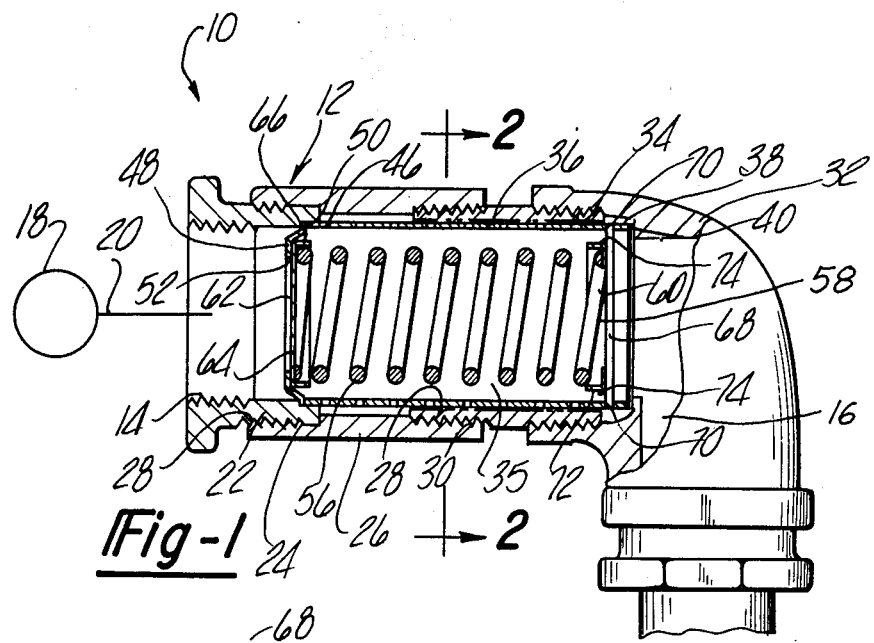
FIG. 1 is a longitudinal sectional view illustrating the relief valve according to the present invention.
Figures 2, 3:
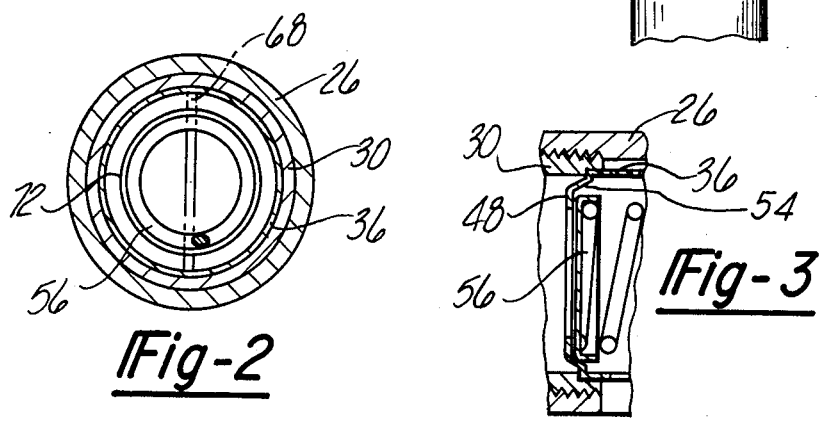
FIG. 2 is a sectional view taken substantially along line 2—2 in FIG. 1.
FIG. 3 is a fragmentary sectional view illustrating the relief valve in an open position.

With reference first to FIGS. 1 and 2, the relief valve 10 according to the present invention is thereshown and comprises a housing 12 having an inlet 14 and an outlet 16. The inlet 14 is connected to a fluid system 18 via a fluid line 20, both of which are illustrated only diagramatically, while the outlet 16 is connected, for example, to a fluid reservoir. In a manner which will be subsequently described in greater detail, when the fluid pressure in the fluid line 20 exceeds a predetermined value, the relief valve 10 opens and permits fluid flow from the inlet 14 and to the outlet 16.

The housing 12 is of a simple and inexpensive construction and comprises a reducing bushing 22 at the inlet 14 with an externally threaded portion 24 at its axial end opposite from the fluid line 20. A conventional pipe fitting 26 is internally threaded at 28 on each axial end and is threadably connected at one end to the threaded portion 24 of the bushing 22. An externally threaded conventional pipe fitting 30 is threadably connected to the other axial end of the first pipe fitting 26. Finally, an elbow pipe fitting 32, internally threaded at one end 34, is threadably connected to the other axial end of the second pipe fitting 30 to complete the housing 12. The interiors of the pipe fittings 26, 30 and 32 together form a fluid passageway 35 for connecting the inlet 14 to the outlet 16.

A perforated tube 36, preferably circular in cross-sectional shape, is slidably insertable and positioned within the fluid passageway 35 and abuts at one end 38 against an annular surface 40 (FIG. 4) in the elbow pipe fitting 32. The other axial end 46 of the perforated tube 36 abuts against one axial side and at the outer periphery of a valve seat 48. The opposite axial side of the valve 48 in turn abuts against an annular surface 50 formed in the bushing 22 so that, upon tightening the bushing onto the first pipe fitting 26, the outer periphery of the valve seat 48 is securely sandwiched between the perforated tube 36 and the bushing 22.

The valve seat 48 is annular in shape and includes a central opening 52. Moreover, the valve seat 48 tapers axially from its outer periphery and to the central opening 52 towards the inlet 14 as shown at 54 (FIG. 3) for a reason to be subsequently described.

An elongated helical spring 56 is positioned longitudinally within the perforated tube 36 and has one end 58 positioned adjacent the inlet 14 and its other end 60 positioned adjacent the outlet 16. A cup-shaped valve member 62 having a central circular portion 64 and an annular outer sidewall 66 is positioned over the end 58 of the helical spring 56. In this fashion a portion of the spring 56 is received and entrapped between the valve member sidewall 66 and its circular portion 64. The valve member circular portion 64 is larger in diameter than the valve seat opening 52.

At the opposite end 60 of the spring 56 a cylindrical stop pin 68 having a length substantially the same as the outer diameter of the perforated tube 36 is disposed through substantially diametrically opposed apertures 70 in the perforated tube 36. A cup-shaped spring retainer 72 is attached to the pin 68 by conventional means, such as welds 74, which entraps and retains the end 60 of the spring 56.

With reference now to FIGS. 1 and 3, the spring 56 is in a state of compression between the spring retainer and the valve seat 48 so that the spring 56 urges the valve member 62 against its seat 48. The valve member 62 thus covers the valve seat opening 52 and prevents fluid communication through the relief valve passageway 35. The tapered portion 54 of the valve seat 48 also insures that the valve member 62 remains centered over the valve seat opening 52. When a sufficient amount of pressure is present on the fluid line 20, however, the fluid pressure will overcome the force of the spring 56, as shown in FIG. 3, thus compressing the spring 56 and displacing the valve member 62 away from its valve seat 48. In doing so, the excessive pressure on the fluid line 20 exhausts through the passageway 35 of the relief valve 10 in the desired fashion.

Figure 4:
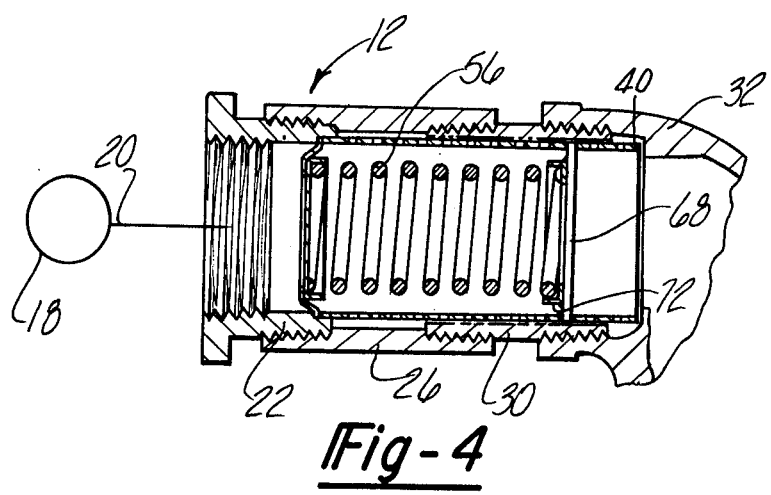
FIG. 4 is a fragmentary sectional view illustrating the relief valve according to the present invention with the spring compressed to provide a larger cracking pressure than the spring positioning shown in FIG. 1.

With reference now to FIGS. 1 and 4, the opening or cracking pressure setting of the relief valve 10 can be easily and simply adjusted by varying the axial position of the stop pin 68 with respect to the perforated tube 36. Thus, by resetting the position of stop pin 68 to the position shown in FIG. 4, the compression of the spring 56 is increased which likewise increases the cracking or opening pressure of the relief valve 10. Moreover, this adjustment of the cracking pressure for the relief valve 10 can be simply and easily carried out in the field by simply removing the reducing bushing 22 and the perforated tube 36. The position of the stop pin 68 can then be manually repositioned into a new set of diametrically opposed apertures in the perforated tube 36. The relief valve 10 is then reassembled by refastening the bushing 22 to the pipe fitting 26.

It can therefore be seen that the present invention provides a relief valve which enjoys many advantages over the previously known relief valves. In particular, the opening or cracking pressure of the relief valve is not only adjustable, but in addition, this adjustment can be simple and rapidly carried out at the installation site of the relief valve. Moreover, since a single relief valve can be adjusted over a relatively wide range of pressure settings, the previously known necessity of stocking a complete line of relief valves with different pressure settings is entirely eliminated.

The relief valve 10 of the present invention is further advantageous in that standard, conventional and very inexpensive pipe fittings are employed as the relief valve housing. These pipe fittings not ony replace the previously known expensive cast housings but also eliminate the need to burst or pressure test the housing since pipe fittings are already pressure tested and rated.

The present invention is further advantageous due to its very inexpensive construction. In addition to the very inexpensive pipe fittings employed for the housing, only the perforated tube 36, the valve member 62 and its seat 48, the stop pin 68 and the helical spring 56 are required for its construction.

Having described my invention, however, many modifications thereto will become apparent to those skilled in the art to which it pertains without deviation from the spirit of the invention as defined by the scope of the appended claims.

We claim:

1. A relief valve adapted for connection with a fluid system, said relief valve comprising:

an elongated housing having an inlet and an outlet;

an elongated fluid passage means formed through said housing and fluidly connecting said inlet to said outlet;

a valve means comprising a valve seat positioned in said fluid passage means adjacent said inlet and a valve member which cooperates with the valve seat to fluidly close the fluid passage means;

an elongated tubular member coaxially disposed within said fluid passage means, said tubular member having a plurality of longitudinally and circumferentially spaced apertures formed through it substantially along its entire length;

elongated resilient means for urging said valve member against said valve seat, said resilient means being positioned within said tubular member and having one end abutting against said valve member; and means for adjustably varying the force with which said resilient means urges said valve member against said valve seat, said adjustable varying means further comprising a pin selectively disposed through substantially diametrically opposed apertures in said tubular member and abutting against the other end of said resilient member whereby the effective length of said resilient member can be varied by positioning said pin through longitudinally spaced pairs of apertures in said tubular member.

2. The relief valve as defined in claim 1 wherein said resilient means is a helical spring.

3. The relief valve as defined in claim 1 wherein said housing further comprises:
   a reducing bushing one end of which forms the fluid inlet, wherein said valve seat is disposed within the other end of said bushing, and
   at least one standard pipe fitting connected to said bushing.

4. The relief valve as defined in claim 3, wherein said housing further comprises:
   a first standard pipe fitting threaded at each end and threadably engaging said bushing at one end;
   a second standard pipe fitting threaded at each axial end and threadably connected at one end to the other axial end of said first pipe fitting; and
   a third standard pipe internally threaded at one end and threadably connected to the other axial end of said second fitting.

5. The relief valve as defined in claim 4, wherein said third pipe fitting includes a radially inwardly extending annular abutment surface at its threaded end and wherein said housing further includes an elongated tubular member extending through said first and second pipe fittings, said tubular member abutting against said third pipe fitting annular surface at one end and abutting against one side of said valve seat at its other end, the other side of said valve seat abutting against an annular surface in the bushing.

6. The relief valve as defined in claim 5, wherein said tubular member is a perforated tube, said relief valve further comprising a stop pin disposed through substantially diametrically opposed apertures in the perforated tube at a position spaced from the valve seat, said resilient means being disposed between said valve seat and said stop pin.

* * * * *